US010798035B2

(12) United States Patent
Lewis et al.

(10) Patent No.: US 10,798,035 B2
(45) Date of Patent: *Oct. 6, 2020

(54) SYSTEM AND INTERFACE THAT FACILITATE SELECTING VIDEOS TO SHARE IN A MESSAGING APPLICATION

(71) Applicant: Google LLC, Mountain View, CA (US)

(72) Inventors: Justin Lewis, South San Francisco, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,811

(22) Filed: Feb. 15, 2019

(65) Prior Publication Data

US 2019/0182190 A1    Jun. 13, 2019

Related U.S. Application Data

(63) Continuation of application No. 14/793,854, filed on Jul. 8, 2015, now Pat. No. 10,212,111.

(Continued)

(51) Int. Cl.
*H04L 12/58* (2006.01)
*G06F 16/70* (2019.01)
*H04W 4/12* (2009.01)

(52) U.S. Cl.
CPC .............. *H04L 51/08* (2013.01); *G06F 16/70* (2019.01); *H04L 51/10* (2013.01); *H04W 4/12* (2013.01)

(58) Field of Classification Search
CPC ... H04L 51/08; H04L 51/10; G06F 17/30781; H04W 4/12
See application file for complete search history.

(56) References Cited

U.S. PATENT DOCUMENTS 7,293,275 B1 * 11/2007 Krieger .............. H04N 5/44543
 348/E5.105
8,793,256 B2 * 7/2014 McIntire ................. G06F 16/41
 707/741

(Continued)

OTHER PUBLICATIONS

International Search Report & Written Opinion of the International Search Authority dated Dec. 17, 2015 in International Patent Application PCT/US2015/049258.

(Continued)

*Primary Examiner* — Mandrita Brahmachari
(74) *Attorney, Agent, or Firm* — Byrne Poh LLP

(57) ABSTRACT

Systems and methods are provided that facilitate selecting videos to share in a messaging session such as group video chat. In one or more aspects, a system is provided that includes an interface component configured to generate a graphical user interface that facilitates selecting by a user of the device, one or more videos provided by a remote streaming media provider, for sharing with one or more other users in association with a messaging session between the user and the one or more other users, the interface comprising a plurality of input categories including at least one video selection category corresponding to information identifying a set of videos associated with a shared attribute. The system further includes a presentation component configured to display the graphical user interface via a display screen of the device in response to a request.

20 Claims, 12 Drawing Sheets

Related U.S. Application Data

(60) Provisional application No. 62/049,832, filed on Sep. 12, 2014.

(56) References Cited

U.S. PATENT DOCUMENTS

| | | | |
|---|---|---|---|
| 9,021,370 B1* | 4/2015 | Carlson | G06Q 30/0607 715/751 |
| 2003/0004983 A1* | 1/2003 | Cohen | G06F 9/451 715/205 |
| 2003/0065729 A1 | 4/2003 | Leinonen | |
| 2004/0031058 A1* | 2/2004 | Reisman | G06F 16/954 725/112 |
| 2005/0021624 A1* | 1/2005 | Herf | H04L 12/1822 709/204 |
| 2006/0212583 A1 | 9/2006 | Beadle et al. | |
| 2007/0101364 A1* | 5/2007 | Morita | G06F 3/04817 725/38 |
| 2007/0168448 A1 | 7/2007 | Garbow et al. | |
| 2007/0271340 A1* | 11/2007 | Goodman | G06Q 10/107 709/206 |
| 2009/0006547 A1* | 1/2009 | Banatwala | G06Q 10/10 709/204 |
| 2009/0013265 A1 | 1/2009 | Cole et al. | |
| 2010/0123724 A1* | 5/2010 | Moore | G06F 3/04817 345/473 |
| 2010/0159883 A1 | 6/2010 | Pascal et al. | |
| 2012/0047529 A1* | 2/2012 | Schultz | H04N 21/252 725/34 |
| 2012/0124517 A1* | 5/2012 | Landry | G06F 3/0482 715/810 |
| 2012/0216139 A1* | 8/2012 | Ording | H04M 1/72522 715/773 |
| 2012/0233646 A1* | 9/2012 | Coniglio | H04N 21/234327 725/78 |
| 2012/0324495 A1* | 12/2012 | Matthews, III | H04H 60/372 725/14 |
| 2013/0110769 A1* | 5/2013 | Ito | G06Q 10/10 707/609 |
| 2013/0147933 A1* | 6/2013 | Kulas | H04N 21/41407 348/61 |
| 2013/0225087 A1* | 8/2013 | Uhm | H04L 67/34 455/41.3 |
| 2013/0275429 A1 | 10/2013 | York et al. | |
| 2013/0332856 A1* | 12/2013 | Sanders | G06F 16/176 715/753 |
| 2014/0006951 A1* | 1/2014 | Hunter | H04H 60/31 715/719 |
| 2014/0032473 A1* | 1/2014 | Enoki | G06Q 30/00 706/52 |
| 2014/0136990 A1 | 5/2014 | Gonnen et al. | |
| 2014/0143355 A1 | 5/2014 | Berdis et al. | |
| 2014/0222775 A1* | 8/2014 | Zohar | G06F 16/735 707/709 |
| 2014/0325359 A1* | 10/2014 | Vehovsky | H04N 9/8205 715/723 |
| 2014/0344103 A1 | 11/2014 | Zhu et al. | |
| 2014/0359496 A1* | 12/2014 | Cammarata | G06F 3/04817 715/763 |
| 2015/0149544 A1 | 5/2015 | Zhang | |
| 2015/0207765 A1* | 7/2015 | Brantingham | H04L 51/046 715/758 |
| 2015/0242459 A1* | 8/2015 | Krishna | G06F 16/93 707/737 |
| 2015/0264308 A1* | 9/2015 | Chastney | H04N 7/147 715/753 |
| 2016/0014060 A1* | 1/2016 | Vasudevan | H04L 51/14 709/206 |

OTHER PUBLICATIONS

Notice of Allowance dated Sep. 24, 2018 is U.S. Appl. No. 14/793,854.

Office Action dated Mar. 30, 2018 in U.S. Appl. No. 14/793,854.

Office Action dated Oct. 11, 2017 in U.S. Appl. No. 14/793,854.

* cited by examiner

SYSTEM AND INTERFACE THAT FACILITATE SELECTING VIDEOS TO SHARE IN A MESSAGING APPLICATION

CROSS-REFERENCE TO RELATED APPLICATIONS

This application is a continuation of U.S. patent application Ser. No. 14/793,854, filed Jul. 8, 2015, which claims the benefit of U.S. Provisional Patent Application No. 62/049,832 filed Sep. 12, 2014, each of which is hereby incorporated by reference herein in its entirety.

TECHNICAL FIELD

This application generally relates to a system and interface that facilitate selecting videos to share in a messaging application.

BACKGROUND

Conventional messaging applications allow users to share textual messages with one another in various formats using a variety of wireless communication protocols. In addition to sharing text based messages, some messaging applications allow users to share multimedia with one another, such as pictures, music, or videos. Sharing multimedia via messaging applications in addition to and/or in the alternative to text offers a richer and more emotional and engaging form of expression.

Generally, the multimedia available for selection by a user for sharing with another user in a messaging session is owned by the user and/or stored at the user's device. Users can also share links to multimedia objects (e.g., pictures, videos, songs, etc.) provided by various networked content providers. By limiting users to multimedia located on their devices, the users are deprived of a world of other multimedia options that could greatly enhance his or her messaging experience. In addition, by requiring the user to find a multimedia item provided by an external content provider in the middle of a conversation, the task of finding multimedia for sharing becomes the user's primary concern over engaging in the messaging session at hand.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
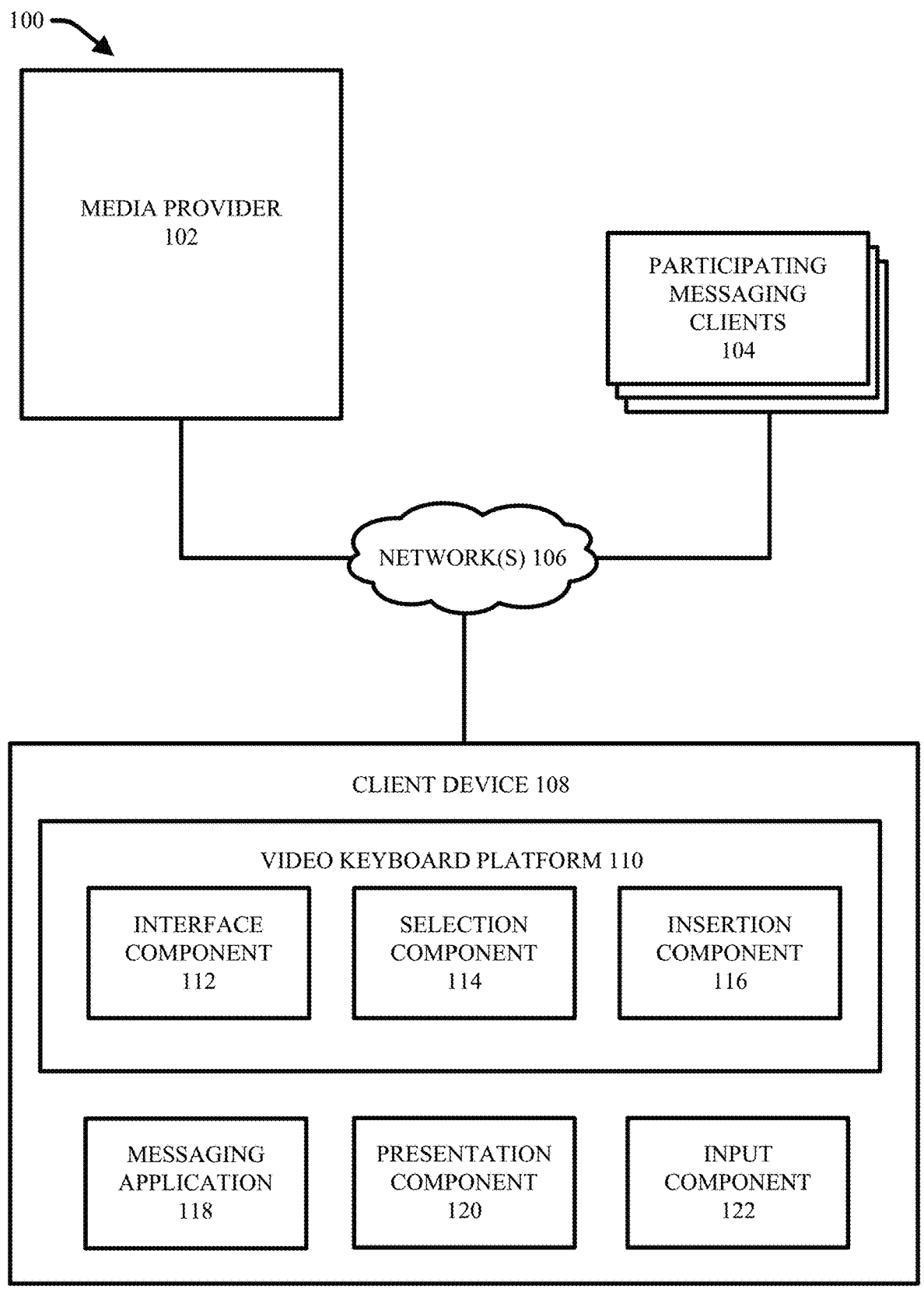
FIG. 1 illustrates an example system that facilitates selecting videos to share in a messaging application in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to a contextual user interface for selecting videos to share in association with a messaging session provided by a messaging application (e.g., an instant messaging session, a group chat, a short messaging service (SMS) texting application, etc.), and a system which generates suggested videos for making accessible via the user interface.

Conventional messaging applications allow users to share textual messages with one another in various formats using a variety of wireless communication protocols. In addition to sharing text based messages, some messaging applications allow users to share multimedia with one another, such as pictures, music, or videos. Generally, the multimedia available for selection by a user for sharing with another user in a messaging session is owned by the user and/or stored at the user's device. For example, when employing a messaging application provided on a user's mobile device to send a message to another user, the user can choose on option to attach a multimedia object to the message. The multimedia objects that are then offered for selection by the messaging application include those provided in memory of the user's mobile device. With this scenario, a user first engages in a messaging conversation and then chooses a multimedia item provided on the user's device to share with another user in association with the messaging session.

Users also often share links to multimedia objects (e.g., pictures, videos, songs, etc.) provided by a networked content provider with others using messaging applications. For example, while exploring a media sharing service that provides a plethora of streaming videos to users via a network, a user can come across a video that he or she would like to share with his or her friends. The user can the choose an option, provided by the media sharing service, that allows the user to send a link to the video and/or embed the video in a message and send the message to his or her friends. With this scenario, the user first finds a multimedia item provided by an external content provider (e.g., not content stored on the user's device), and then chooses a messaging application to share the multimedia item.

Sharing multimedia via messaging applications in addition to and/or in the alternative to text offers a richer and more emotional and engaging form of expression. However, by limiting users to multimedia located on the user's device for sharing via the messaging session, the user is deprived of a world of other multimedia that could greatly enhance his or her messaging experience. In addition, by requiring the user to find a multimedia item provided by an external content provider and then choose a messaging application via which to share it with another user, the task of finding multimedia for sharing becomes the user's primary concern over engaging in the messaging session at hand.

In view of the above observed deficiencies associated with multimedia sharing, a system is provided that facilitates selecting videos to share in a messaging session established via a messaging application (e.g., an instant messaging session, a group chat, a short messaging service (SMS) texting application, etc.), wherein the videos are provided by an external content provider (e.g., not stored on the user's device). The messaging application can be associated with the external content provider and/or affiliated with another service provider. In an aspect, the system generates and/or employs a contextual user interface that facilitates selecting one or more videos provided by the external content provider to share in association with the messaging session. According to this aspect, in association with a messaging session established via a messaging application, a user can select an option provided by the messaging application to open a user interface that facilitates sharing videos and other media provided by the external content provider. Such an interface is referred to herein as the media sharing (MS) keyboard.

The MS keyboard can include a menu with various video selection categories corresponding to videos grouped by a similar attribute. For example, one category can include videos provided by the external content provider that have been previously watched by the user employing the MS keyboard in association with the messaging session. Another category can include videos provided by the external content provider that have been recommended to the user by the content provider based on his or her preferences. Another category can include videos and channels subscribed to by the user via an account the user has established with the external content provider. Another category can include videos frequently shared by other users of the external content provider. It should be appreciated that the disclosed systems, methods, and interfaces are not limited to those video selection categories exemplified herein and that a variety of types of video selection categories are suitable for inclusion in an MS keyboard.

In response to selection of a video selection category from the MS keyboard, a list of videos or video references (e.g., video thumbnail, video URL, video title, etc.) corresponding to the category can be presented to the user. The user can then select one or more of the videos included in the list to share via the messaging session. For example, selection of a video included in the list can result in attachment of a link to the video in a message of the messaging session. In another example, selection of a video can result in embedding of the video in a message of the messaging session. Still in yet another example, selection of a video can result in the inclusion of some form of data representative of the video (e.g., a thumbnail image, text, a snippet from the video, an animation associated with the video, etc.) in a message of the messaging session.

In an aspect, the MS keyboard can also include other categories corresponding to functional tools that can enhance the user experience in association with a messaging session. For example, another category can include an "add text" option which can facilitate adding text to messages or videos shared via the messaging session. In response to selection of the "add text" option, a traditional keyboard input interface object can be generated and presented to the user. Another category can correspond to an "add person" option which can facilitate selecting and adding a new user to the messaging session. In another example, the MS keyboard can include a category corresponding to "take a video," which can facilitate opening of a camera application of the device at which the MS keyboard is displayed and taking of a video. In yet another example, a category can correspond to a "search" tool that allows the user to search for videos, provided by the external content provider, to share via the messaging application.

In addition to the MS keyboard, a system or service is disclosed that facilitates customization of an instance of an MS keyboard to a user and the context of a particular messaging session for which the MS keyboard is employed. In particular, this system or service can extract, receive or otherwise discern information about a current messaging session including but not limited to: multimedia shared in the current messaging session, multimedia shared by the user in the current messaging session or a past messaging session, characteristics and preferences of the user (e.g., language, location, and other information about the user's multimedia preferences, watch history and/or media sharing history), other users participating in the current messaging session, characteristics and preferences of the other users participating in the current messaging session, text or words shared via the current messaging session, or a location of the user's device at which the MS keyboard is generated.

In an aspect, based on this information, the system/service can determine or infer what video selection categories to include in a particular instance of an MS keyboard and which videos (provided by the external content provider) to include in the video selection categories. For example, the system/service can determine categories and respective videos for association with those categories that are tailored to the user (e.g., a category with user's favorite videos, a category with videos from the user's channel, a category with videos the user frequently shares or accesses, a category with videos recommended to the user by the external content provider, etc.). In another example, the system/service can determine categories and respective videos for association with those categories that are relevant to the current messaging session. According to this example, when a video is shared from a particular channel, the system can determine that a category including videos provided by that channel should be included in the MS keyboard. Similarly, when music videos from a particular artist or genre are shared via the messaging session, the system/service can determine that a category including music videos from the particular artist or genre should be included in the MS keyboard.

In another aspect, based on monitored or received information associated with a messaging session and the user, the system/or service can determine or infer what video selection categories and/or other input categories provided by the MS keyboard are most relevant to a current context or point in time of a messaging session. The MS keyboard can then adapt the position and arrangement of the respective categories offered by the MS keyboard about the user interface accordingly. For example, a video selection category corresponding to a set of videos from a channel that is currently being discussed can be positioned at the forefront of the display screen while a category that has not been accessed by the user recently can be moved to a less prominent position about the user interface.

As a result of the disclosed systems/services, an MS keyboard can be both personalized and contextual. New video selection categories can be generated and provided via the MS keyboard as they become relevant. For example, a channel specific video category can be created in response to discussion or sharing of a video from the channel. In addition, videos that have been shared recently by the user in other messaging sessions can be categorized in their own "recently shared" category. In another example, videos that have already been shared in a current messaging session can be distinguished so that the same video is not shared to with the current messaging session twice. Furthermore, the MS keyboard can continually adapt based on relevance to a current point of a messaging application, users involved in the messaging application preferences of those users, and context of the device/user employing the MS keyboard.

In one or more aspects, a system is provided that includes an interface component configured to generate a graphical user interface that facilitates selecting by a user of the device, one or more videos provided by a remote streaming media provider, for sharing with one or more other users in association with a messaging session between the user and the one or more other users, the interface comprising a plurality of input categories including at least one video selection category corresponding to information identifying a set of videos associated with a shared attribute. The system further includes a presentation component configured to display the graphical user interface via a display screen of the device in response to a request.

In another aspect, a method is disclosed that includes receiving a generating a graphical user interface that facilitates selecting by a user of the interface, one or more videos provided by a remote streaming media provider for sharing with one or more other users in association with a messaging session between the user and the one or more other users, the interface comprising a plurality of input categories including at least one video selection category corresponding to information identifying a set of videos associated with a shared attribute. The method further includes displaying the graphical user interface via a display screen of the device in response to a request.

Further provided is a tangible computer-readable storage medium having computer-readable instructions that, in response to execution, cause a computing system to perform operations. These operations can include receiving context information regarding context of a messaging session, including information identifying another video shared in the messaging session, determining an attribute associated with videos provided an external video provider based the context information, generating a video selection category corresponding to a set of videos that share the attribute, and including the video selection category in a graphical user interface that facilitates selecting by a user of the interface, one or more videos provided by the external video provider for sharing in the messaging session.

Referring now to the drawings, with reference initially to FIG. 1, presented is a diagram of an example system 100 that facilitates selecting videos to share in a messaging application in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102, client device 108 including video keyboard platform 110, one or more other client devices 104, and one or more networks 106 for connecting the various components of system 100. Generally, media provider 102 and client devices 104 and 108 can include memory that stores computer executable components and a processor that executes the computer executable components stored in the memory, examples of which can be found with reference to FIG. 11.

Media provider 102 can include an entity configured to provide streaming media (e.g., video, live video, animations, audio, music etc.) to users at their respective client devices 104/108 via a network 106. The streaming media can be accessed by the respective users via their respective client devices at a network based platform (e.g., a website or a mobile application) employed by the media provider 102. For example, media provider 102 can include an Internet based media sharing service configured to allow users to upload and share media content. Media provider 102 can stream the media content to client devices 104/108 for playing at the client devices (e.g., via presentation component 120) in response to a request for the media content. In an aspect, media provider 102 has access to a voluminous quantity (and potentially an inexhaustible number) of shared media (e.g., video and/or audio) files for streaming to client devices 104/108 on demand. The media can be stored in memory associated with the media provider 102 and/or at various servers employed by the media provider and accessed by client devices 104/108 using a networked platform (e.g., a website platform, a mobile application, etc.) employed by the media provider 102.

The term media content or media item can include but is not limited to streamable media (e.g., video, live video, video advertisements, animations, music, music videos, sound files and etc.) and static media (e.g., pictures, thumbnails). The term media content or media item also includes a collection of media items such as a playlist including several videos or songs, or a channel including several videos or songs associated with a single media creator or curator. A channel can include data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

Client devices 104/108 can include any suitable computing device associated with a user and configured to interact with media provider 102 and/or one another via a messaging application. For example, client device 112 can include a desktop computer, a laptop computer, a television, an Internet enabled television, a mobile phone, a smartphone, a tablet personal computer (PC), or a personal digital assistant PDA. In an aspect, client device 108 (e.g., and client devices 104) can include presentation component 120 to generate a user interface (e.g., a graphical user interface or virtual interface) that displays media content provided by media provider 102 to a user of the client device 104. In particular, presentation component 120 can play videos provided by media provider 102 as streamed to client device 108. Presentation component 120 can also generate and/or display an MS keyboard configured/generated by video keyboard platform 110 as described infra.

As used in this disclosure, the terms "content consumer," "user," or "participant" refers to a person, entity, system, or combination thereof that employs system 100 (or additional systems described in this disclosure) using a client device 104/108. Networks 106 can include wired and wireless networks, including but not limited to, a cellular network, a wide area network (WAD, e.g., the Internet), a local area network (LAN), or a personal area network (PAN). For example, a client device 108 can communicate with media provider 102 and/or another client device 104 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Client device 108 can include video keyboard platform 110 to facilitate selecting media items, provided by media provider 102 to share with another user or users via a messaging session. For exemplary purposes, client devices 104 are referred to herein as "participating messaging clients" to indicate that they are engaged in or capable of engaging in a messaging session with client device 108/user of client device 108. As used herein, the term messaging session refers to an electronic communication of messaging data, including at least some form of multimedia or representation of the multimedia (e.g., video, animation, music, etc.), between two or more users over a network 106 via a messaging application or messaging client. The messaging application or messaging client can facilitate transmission of messages between users over various domains, (e.g., mobile, web-based, cellular, etc).

A messaging session as described herein can involve the exchange of messages including text, multimedia, and/or voice in a real-time (e.g., instant messaging or chat) or a non real-time (e.g., email) format. For example, a messaging session can include a group messaging session between a plurality of users via a mobile messaging application provided on respective mobile client devices of the plurality of users. In an aspect, the group messaging session can enable the respective users to share multimedia messages with one another in the form of an embedded or attached video object or link to a video object. The group based messaging session can also enable the respective users to share traditional text based messages with one another. In another example, a messaging session can include an SMS text based messaging session between two or more users or an email exchange between two or more users. In yet another example, a messaging session can include a string of posts between users (e.g., in a chat or non-live format) to a server based messaging board or forum.

In an aspect, client device 108 can include a messaging application 118 to establish and facilitate a messaging session between a user of client device 108 and one or more other users at their respective client devices 104. For example, messaging application 118 can facilitate a mobile electronic messaging session between a user of client device 108 and another user or a group of users. In an aspect, the messaging application 118 can facilitate a group chat using a web-based messaging format. In another aspect, the messaging application can facilitate sharing of SMS or MMS messages.

In an aspect, messaging application 118 is provided by a service provider that is not affiliated with media provider 102. For example, messaging application 118 can include a messaging function provided by a social media service provider, a remote messaging service provider, or a cellular service provider. In another aspect, messaging application 118 can be affiliated with and/or provided by media provider 102. For example, in addition to providing streaming media, media provider 102 can provide a messaging service that enables users to share messages (e.g., in the form of a group chat or messaging forum) with one another regarding media provided by media provider 102. According to this aspect, in association with access of media provider 102 using a website platform or mobile application platform of the media provider 102, a user can access and open a messaging application/function provided by the media provider 102. The messaging application/function can allow the user to establish a public or private messaging session with one or more other users for the exchange of messages including videos provided by media provider 102 and/or information representative of videos provided by media provider 102 (e.g., links to the videos, thumbnails for the videos, etc.). The messages can also include text, symbols, images and/or sound. For example, where a user of client device accesses media provider 102 via a resident application client for the media provided located on client device 108, the resident application can include a messaging function that enables a messaging session between the user and one or more other users. According to this example, messaging application 118 can be a function offered by the resident client application for media provider 102.

In aspect, messaging application 118 is a media messaging application that enables sharing of messages including media items or data representative of the media items, provided by media provider 102, between two or more users in a messaging format. For example, messaging application 118 can allow users to share videos provided by media provider 102, links to videos provided by media provider 102, or embedded videos provided by media provider 102 in messages of a messaging session between two or more users.

For example, messaging application 118 can set up and facilitate a group chat between a user of client device 108 and users of client devices 104 wherein messages of the group chat can include videos provided by media provider 102 and/or video references to videos provided by media provider 102. A video reference can include but is not limited to: information identifying a video, information identifying a specific point or segment of a video, a link to a video, a playlist a video occurs in, a channel a video occurs in, or a thumbnail for a video. For example, using messaging application 118, a user can send a link to a video, provided by media provider 102, in a message of a messaging session between a group of users and identify a segment of the video that the user finds entertaining. In another example, using messaging application, a user can send a group message to users of a group messaging session that includes an embedded video provided by media provider 102.

In an aspect, videos provided by media provider 102 can include short video animations (e.g., Vmoji) from about a few seconds to about ten seconds) that include or do not include sound. These animations can be generated from a longer videos and provide a reference to the longer video. For example, a short video animation associated with a longer video can include a clip of a woman saying a popular quote from a the video or a clip of a person performing a funny dance move from a popular dance scene of the video. Accordingly, rather than sharing a whole video, messaging application 118 can allow a user to share a message that includes short video animations provided by media provider 102 or clips from videos provided by media provider 102.

Interface component 112 is configured to generate and/or configure a graphical user interface, referred to herein as the media selection (MS) keyboard, that facilitates selecting media items (e.g., videos, Vmoji, songs, channels, playlists, images, etc.), provided by media provider 102, for attaching or otherwise including (e.g., embedding, embedding a link, etc.) in the messages of the messaging session. In an aspect, interface component 112 is configured to generate a MS keyboard in response to a request for the MS keyboard in association with a messaging session. For example, as a user is participating in the messaging session, the user can request to employ the MS keyboard to facilitate selecting media, provided by media provider 102, to include in a message for sharing via the messaging session. According to this example, the user can select an icon or apply a voice command (or some other form of input command) via input component 122 on client device 108 that represents a request for the MS keyboard. In response to the request, interface component 112 can generate the MS keyboard.

A MS keyboard can include a variety of features that facilitate selecting media, provided by media provider 102, for inclusion in a message of a messaging session. In an aspect, interface component 112 can generate an MS keyboard that includes one or more video selection categories. A video selection category can identify a set of videos provided by media provider 102 that are grouped based on association with a common feature or attribute. Each video selection category can be displayed on the MS keyboard in a menu format with information identifying the video selection category and indicating the type of videos associated therewith (e.g., "Favorites," "Trending videos," "More from Channel ABC," etc.). Each video selection category can open into a list of videos or video references when clicked.

An intent of the MS keyboard is to make the user's choice of video to share a mechanic of selection instead of a search. In an aspect, the common feature or attribute for which videos are grouped into a video selection category can include a type of video (e.g., music video, movie, reality show, etc.), a genre of video (e.g., comedy, musical, drama, etc.). However, to better guide and facilitate user video selection, the common feature or attribute for a set of videos grouped as a video selection category can identify videos that the user of client device 108 who is employing the MS keyboard would predicatively choose to include in a message of the messaging session. Accordingly, a common feature or attribute for videos grouped into a video selection category offered by the MS keyboard can be related to the user and/or messaging session for which the MS keyboard is employed.

For example, types of videos that a user of an MS keyboard may predicatively choose to include in a message of a messaging session could include but are not limited to: videos the user has previously watched, liked, subscribed to, shared, favorited, saved for watching later, grouped in a playlist, commented on or otherwise endorsed. Accordingly, these types of videos can be respectively associated into video selection categories corresponding to "watched," "liked," "subscribed to," "shared," "favorited," "saved for later", "playlist," and "commented on," or collectively be associated into a video selection category corresponding to "videos you endorse." In another example, videos that the user may choose to include in a message can include videos recommended to the user for watching or sharing by media provider 102 (e.g., based on preferences of the user, watch history of the user, demographics of the user, etc.) or videos from channels subscribed to by the user. Thus other suitable video selection categories can include videos "recommended for watching," "videos "recommended for sharing," or "videos from the Channel Reality Show Bloopers." In an aspect, information regarding user preferences and video endorsement activity can be discerned from a profile or account established by the user with media provider 102.

Other characteristics of videos that could render them good basis for a video selection category can include but are not limited to: videos that are generally popular with media provider (e.g., trending videos), videos that are popular with users of similar interest to the user or friends of the users, videos that are popular with a social group of the user, videos trending on a social network, videos from popular channels of media provider 102, videos from popular playlists of media provider 102, or videos the user has recently shared in other messaging sessions.

Additional examples of characteristics of videos for grouping in a video selection category can include characteristics that render the videos related to a current messaging session, including but not limited to: videos that are related to another video shared in the current messaging session, videos that are related to a channel shared in the current messaging session, videos related to a playlist shared in the current messaging session, video related to a topic of the current messaging session, or videos related to interests of other users participating in the current messaging session.

In an aspect, video keyboard platform 110 and/or media provider 102 can dynamically determine suitable video selection categories (and the videos included therein) to include in an instance of an MS keyboard based on characteristics and preferences of the user and a current context of a messaging session for which the MS keyboard is employed. According to this aspect, the video selection categories offered by the MS keyboard (and the videos associated therewith) can vary/adapt based on the context of the particular messaging session for which it is employed, characteristics/preferences of the user, and prior usage history of the user with the MS keyboard. Thus the appearance and category offerings of the MS keyboard can be both personalized and contextual.

In addition to video selection categories the MS keyboard can also include other categories or menu options that do not correspond to sets of videos or video references but other elements that can enhance the user experience in association with integration of multimedia into a messaging session. In an aspect, other categories that can be provided on the MS keyboard can correspond to functional intents for requests to launch an operation or application enabled by or provided by device 108. For example, another category can include an "add text" option which can facilitate adding text to messages or videos shared via the messaging session. In response to selection of the "add text" option, a traditional keyboard interface object can be generated and presented to the user. In another example, the MS keyboard can include a category corresponding to "take a new video," which can facilitate opening of a camera application of the device at which the MS keyboard is displayed and taking of a video. In another aspect, other categories that can be provided on the MS keyboard can correspond to functional intents for to requests to launch an operation enabled or provided by media provider 102. For example, another category can correspond to a "search" tool that allows the user to search for videos, provided by media provider 102, to share via the messaging application. Another example category can include an option to "upload a video" which can allow the user to upload a new video to media provider 102 prior to sharing it via the messaging application 118. Another example, category can include an option to "edit a video" which can allow the user to edit a video prior to sharing it via the messaging application 118 (e.g., select a clip from the video or time marker associated with the video that the user would like to point out to other users when sharing the video).

In yet another aspect, other categories that can be provided on the MS keyboard can correspond to functional intents for requests to launch an operation enabled or provided by messaging application 118. For example, another category can correspond to an "add person" option which can facilitate selecting and adding a new user to the messaging session.

Figure 2:
FIG. 2 presents example user interfaces associated with selecting videos to share in a messaging application in accordance with various aspects and embodiments described herein.

FIG. 2 presents an example MS keyboard interface 200 displayed on a mobile device in accordance with aspects and embodiments described herein. MS keyboard 200 includes a plurality icons 202-224 corresponding to different input elements or selection categories. Icons 202-212 correspond to video selection categories and icons 214-224 correspond to other functional intents. For example, icon 202 corresponds to a "related" video selection category. This category can include a set of videos that are related to a messaging session associated with the MS keyboard. Icon 204 corresponds to a "watch history" video selection category. This category can include a set of videos provided by media provider 102 that the user has previously watched. Icon 206 corresponds to a "trending" video selection category. This category can include a set of videos provided by media provider 102 that are currently popular or trending with users of the media provider 102. Icon 208 corresponds to a "More from channel abc" video selection category. This category can include a set of videos provided by media provider 102 that are included in channel "abc." In an aspect, this category became included in the MS keyboard because the user or another participant of the messaging session shared a video from channel abc or otherwise discussed channel abc. Icon 210 corresponds to a "favorites" video selection category. This category can include a set of videos provided by media provider 102 that are considered the user's favorites. Icon 218 corresponds to a "suggested" video selection category. This category can include a set of videos provided by media provider 102 that have been recommended to the user for watching and/or sharing in association with the messaging session for which the MS keyboard is deployed. In response to selection of a video selection category icon (e.g., icons 202-212), the set of video represented by the icon can be presented to the user (e.g., in a list format, in a grid format, or other type of presentation format) including text and/or images (e.g., thumbnails) corresponding to the videos in the set.

Icons 202-212 correspond other functional intents that are not video selection categories. For example, icon 214 depicts a keyboard. Selection of icon 214 can open a traditional keyboard or keypad and allow the user to input text for inclusion in a message or association with a media item to be shared in the messaging session. Icon 216 corresponds to a video camera. Selection of icon 216 can open a video camera of the client device and allow the user to take a new video. Icon 218 corresponds to an upload function. Selection of icon 218 can allow the user to upload a new video to media provider 102 prior to sharing the new video. Icon 220 corresponds to a search tool. Selection of icon 220 can allow the user to search for videos, provided by media provider 102, for sharing via the messaging session. Icon 222 corresponds to a video editing tool. Selection of icon 222 can allow the user to edit a newly taken video (e.g., stored at the mobile device) or a video provided by media provider 102 prior to sharing. Icon 224 corresponds to an add new user function. Selection of icon 224 can allow the user to add a new user to a current messaging session.

It should be appreciated that the appearance and arrangement of categories and elements of the MS keyboard can vary and is not limited to that depicted in FIG. 2. Although MS keyboard 200 is depicted with a plurality icons arranged into four rows and three columns, this arrangement can vary. For example, the number of icons displayed, the size of the icons, the location of the icons, the number or rows, the number of columns, etc., can vary. Further, due to the limited dimensions of the device display screen, additional elements/icons corresponding to video selection categories or other input categories can be included on MS keyboard 200 in others window, pages or otherwise non-visible portions of the user interface that can be accessed/revealed by scrolling.

Referring back to FIG. 1, video keyboard platform 110 also includes selection component 114 and insertion component 116. Selection component 114 is configured to receive information indicating a media item (e.g., a video) selected by a user from an MS keyboard for sharing in a messaging session for which the MS keyboard is deployed. For example, selection component 114 can receive user selection of a video, provided by media provider 102, that the user would like to attached to a message, embed in a message, or otherwise include data representative of the video in a message to be shared via the messaging session. Insertion component 116 is configured to attach, embed, or otherwise insert data representative of the selected video into the message to be shared via the messaging session.

Figure 3:
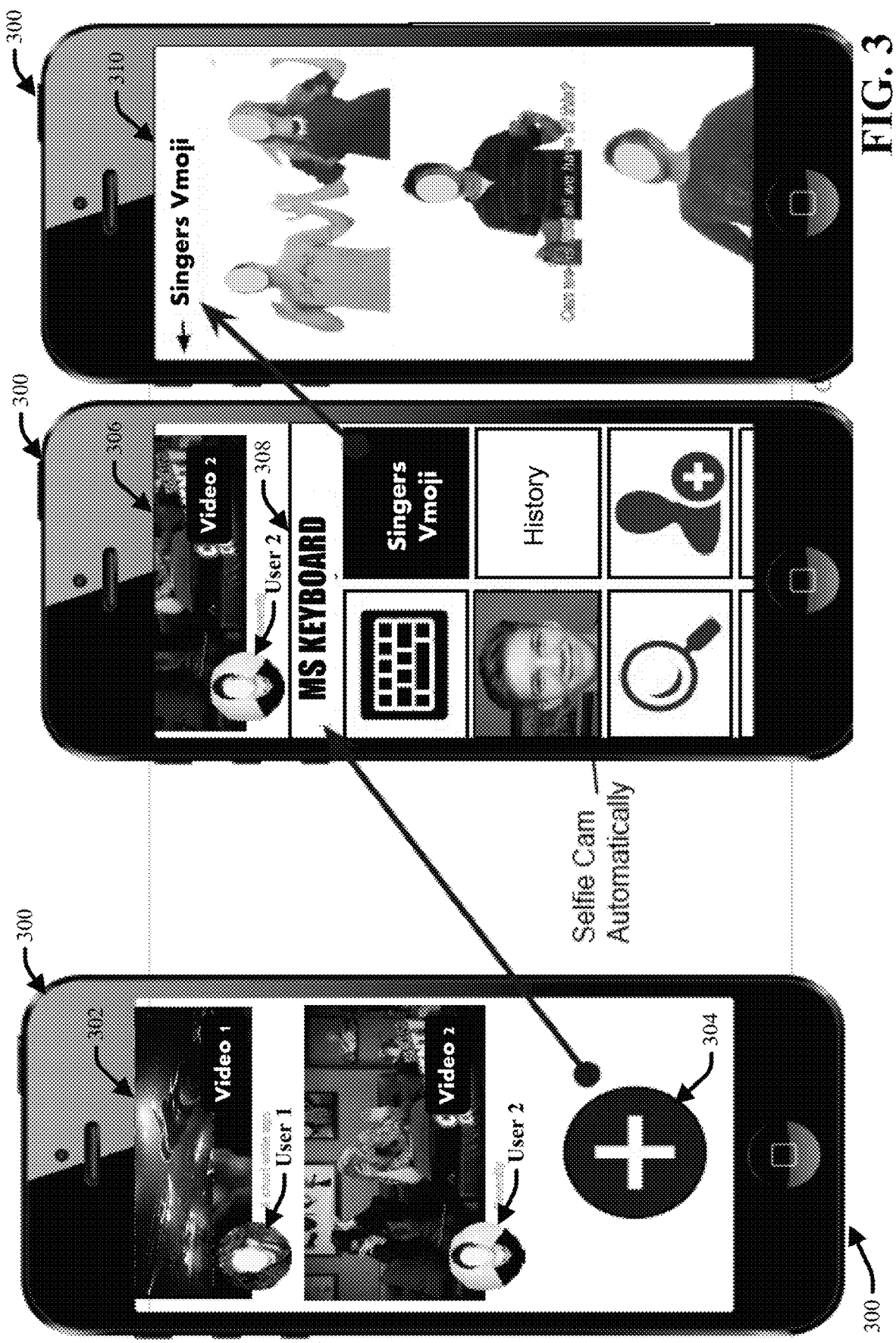
FIG. 3 presents additional example user interfaces associated with selecting videos to share in a messaging application in accordance with various aspects and embodiments described herein.

FIG. 3 presents a series of user interfaces associated with employing an MS keyboard on a mobile device 300 to include media, provided by an external media provider (e.g., media provider 102), in a message of a messaging session. Interface 302 displays a messaging session interface wherein a messaging session is established between two users, user 1 and user 2. The messaging session provides for sharing of media. For example, user 1 has shared a video, video 1, and user 2 has shared a video, video 2, during the messaging session. In an aspect, video 1 and video 2 are embedded videos provided by an external media provider (e.g., media provider 102). For exemplary purposes, user 2 is the owner/user employing client device 300 to which the interfaces 302, 306 and 310 are being displayed.

Messaging session interface 302 further includes an add media button 304. Selection of the add media button by user 2 results in the generation/presentation of interface 306 including MS keyboard 308. MS keyboard 308 facilitates selecting media, provided by a particular external media provider (e.g., media provider 102) for sharing with other users via the messaging session. Similar to MS keyboard 200, MS keyboard 308 can include various menu options, including a keyboard option, a search tool and an "add user" tool. Other menu options/categories provided on MS keyboard 308, include video selection categories "Singer's Vmoji," corresponding to short animations or video clips having sound taken from videos of the channel "Singers." Also included in MS keyboard 308 is the video selection category "History," corresponding to videos that are included in the watch history of user 2. This watch history can specifically refer to videos, provided by the external media provider, that have been watched by user 2. In addition a camera option is included on MS keyboard 308 that automatically takes a self video of user 2 on device 300 (e.g., using a front facing camera of device 300). This self video can be shared via the messaging session and/or uploaded to the external media provider.

Interface 310 corresponds to a graphical user interface that is produced in response to selection of the video selection category corresponding to "Singers Vmoji." As seen in interface 310, a variety of picture icons are displayed corresponding to different Vmoji's included in the Singer's Vmoji category. User 2 can pick one of the picture icons corresponding to a Vmoji for inclusion in message to be shared with the messaging session.

Figure 4:
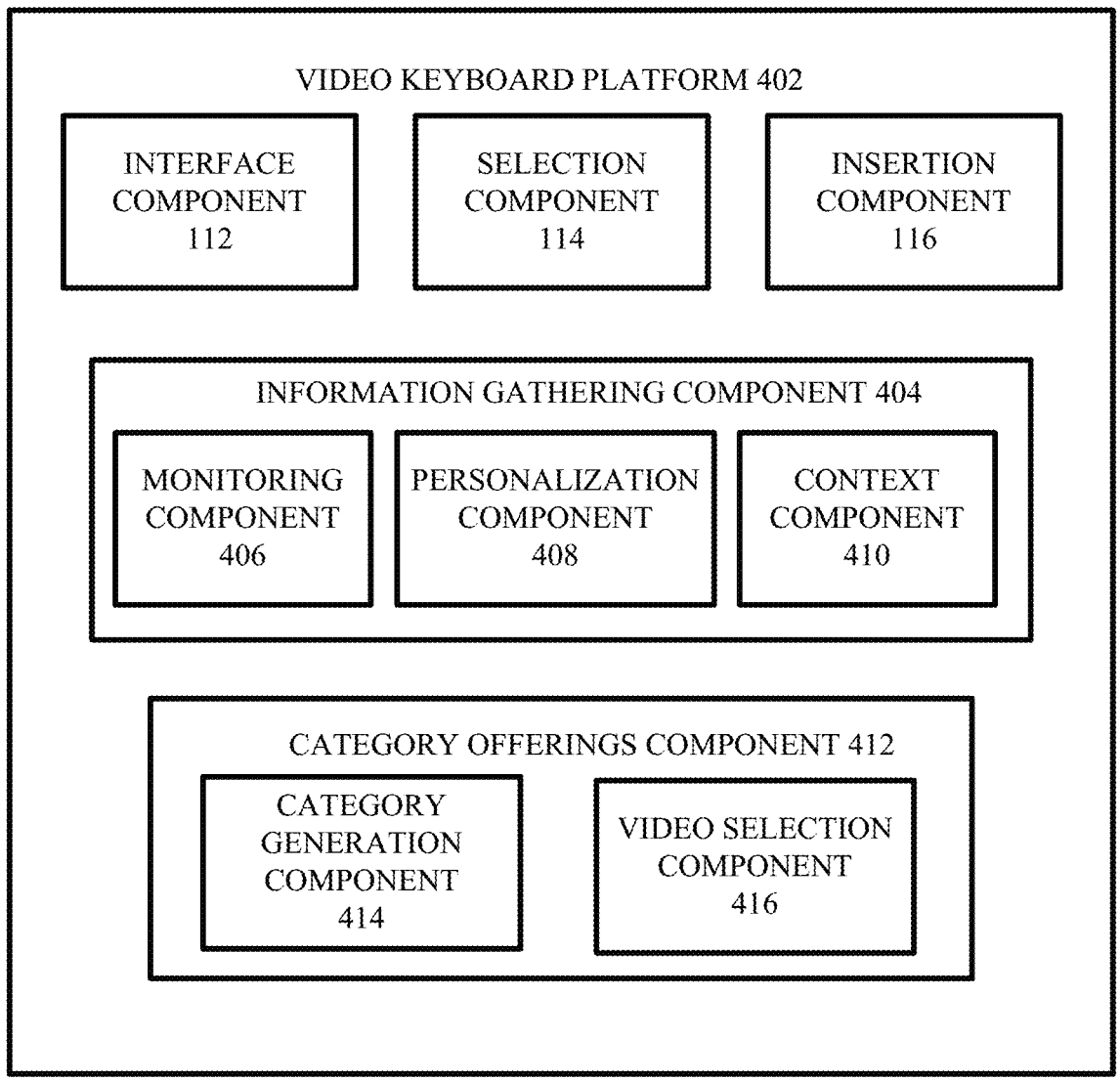
FIG. 4 illustrates an example media sharing keyboard platform that facilitates selecting videos to share in a messaging application in accordance with various aspects and embodiments described herein.

Referring now to FIG. 4, presented is another example video keyboard platform 402 in accordance with aspects and embodiments described herein. Video keyboard platform 402 can include same or similar features as video keyboard platform 110 with the addition of information gathering component 404 and category offerings component 412. Video keyboard platform 402 is depicted isolated from other system components depicted in system 100 merely for exemplary purposes. In an aspect, video keyboard platform 402 is provided on client device 108. However, in other aspects, one or more components of video keyboard platform 402 can be provided at external media provider 102, another external system or device, and/or the cloud.

In an aspect, video keyboard platform 402 can dynamically determine suitable video selection categories (and the videos included therein) to include in an instance of an MS keyboard based on characteristics and preferences of the user of the MS keyboard and a current context of a messaging session for which the MS keyboard is employed. According to this aspect, the video selection categories offered by an MS keyboard (and the videos associated therewith) generated by interface component 112 can vary/adapt based on characteristics/preferences of the user, prior usage history of the user with the MS keyboard, and context of the particular messaging session for which it is employed. Thus the appearance and category offerings of an MS keyboard can be personalized, contextual and dynamic.

According to this aspect, video keyboard platform 402 can include information gathering component 404 and category offerings component 412. Information gathering component 404 is configured to receive information regarding user preferences, user usage history of the an MS keyboard, and context of a messaging session for which an MS keyboard is employed. Category offerings component 412 is configured to employ this information to dynamically determine or infer what video selection categories to offer in an instance of an MS keyboard (e.g., an MS keyboard interface can be customized for each different messaging session and/or over the course of a current messaging session). Interface component 112 can then configure/generate the MS keyboard accordingly.

User preference information can include information related to media preferences of a user. For example, user preference information can include information regarding characteristics of media the user prefers to watch and share. User preference information can also include other information about a user including what social networks the user belongs. User preference information can also include information regarding what types of media selection categories and actions associated with usage of an MS keyboard that the user tends to prefer. In an aspect, information gathering component 408 can include personalization component 408 to receive or access and/or determine/infer user preference information. For example, personalization component 408 can access a user profile/account established with media provider 102. The user profile/account can be associated with information including but not limited to: the user's watch history, media the user likes/dislikes, media the user is subscribed to, media the user comments on, media the user shares and who the user shares the media with, media the user generally endorses, media the user creates, channels the user is subscribed to, playlists the user creates or accesses, social networks the user belongs to, etc. In addition, personalization component 408 can receive information from a user/profile account or another source (e.g., directly provided by the user or inferred by personalization component 408) regarding the user's demographics (e.g., gender, age, ethnicity, language, profession, etc.).

In addition, personalization component 408 can analyze usage patterns to determine what types of media the user has included in messaging session responses in the past, what type of media the user shares with certain other users, and what types of categories the user generally likes. According to this example, information gathering component 404 can include monitoring component 406 to monitor the user's usage history of the MS keyboard to gather such information. It should be appreciated that user preference information can continually evolve over time and that personalization component 408 can regularly update user preference information as it becomes available.

Information regarding context of a messaging session for which an MS keyboard is employed can include but is not limited to, the other users involved in the messaging session, the circumstances that prompted the messaging session, the content shared/discussed in the messaging session, and the tone of the messaging session. For example, context information can include but is not limited to: videos shared or discussed in a current messaging session, degree to which the videos are discussed in the current messaging session, and channels or playlists shared and discussed in a current messaging session. According to this example, monitoring component 406 can monitor a messaging session and determine what media has been shared. In an aspect, where the messaging session is associated with a messaging application that is unaffiliated with media provider 102, the other messaging application can pass information to monitoring component 406 that identifies other media shared and discussed in the messaging session.

Context information can also include identities of other users participating in the current messaging session and various preferences and/or tendencies of the other users. In addition context information can include content or subject matter of a messaging session based on other information aside from media shared in the messaging session. For example, monitoring component 406 can gather information regarding text shared during the messaging session and context component 410 can analyze the text to determine or infer a topic, person, place or thing discussed during the messaging session. For instance, context component 410 can determine that based on the inclusion of the word animals in the messaging session that animals are included in the subject matter of the messaging session. Furthermore, context information can include location information of the device at which the MS keyboard is deployed. According to this aspect, monitoring component 406 can receive location information from the device (e.g., the device's global positioning system determined location or other form of location determination).

Category offering component 412 is configured to employ the user preference information, MS keyboard usage information, and context information to dynamically determine or infer what video selection categories to include in an instance of an MS keyboard. Category generation component 114 can then generate these categories for inclusion in the MS keyboard interface. For example, an MS keyboard can include a default mode with one or more predetermined video selection categories that are applicable to the general user and for any messaging session. As information is learned about a particular user of the MS keyboard and the messaging session for which the MS keyboard is employed, category offering component 412 can choose to add or remove video selection categories to suit the user and the particular context of the messaging session.

In particular, category offering component can 412 analyze clues from the messaging session for which an MS keyboard is deployed and based on these clues, determine or infer what videos the user would most likely be interested in sharing. For example, based on user preferences and usage history, category offering component 412 can determine that a video selection category corresponding to videos from a Channel "ABC" are frequently accessed, watched and shared by the user. Thus category offering component 412 can direct category generation component to generate a category with corresponding to videos from Channel ABC. In another example, based on other videos, channels, and/or playlists that have been shared in a current messaging session, category offering component 412 can determine or infer what video selection categories are relevant to the current messaging session. For example, when a music video from a popular pop artist Erin Colleen is shared, category offering component 414 can determine or infer that related or relevant videos selection categories could include other videos by Erin Colleen, Vmoji associated with Erin Colleen's channel, other videos from female pop artists, other videos from trending pop artists, other videos with similar music, etc. In another example, based on discussion of a particular word or subject, such as yoga, category offerings component 412 can determine that a video selection category corresponding to yoga videos is relevant to the current messaging session. In another example, where a user is located in a particular shopping store such as a grocery store, category offerings component 412 can determine that a video selection category corresponding to cooking videos would be a relevant video selection category.

In yet another example, based on user preference and usage history information regarding videos the user has shared or tends to share with other certain users, category offerings component can tailor offered video selection categories. For instance, usage information can indicate that when the user talks to his friends John and Randy, they often discuss sports and share sports highlights videos. Accordingly, when the user is involved in a messaging session with John or Randy, categories offerings component 412 can determine that a good video selection category for inclusion in the MS keyboard would include one corresponding to sports highlights videos.

Video selection component 416 is configured to select the specific videos for inclusion or association in a particular video selection category. For instance, a video selection category corresponding to sports highlight videos could potentially include hundreds of thousands (or more) of videos. Video selection component 416 can employ the same user preference information, MS keyboard usage information and context information do determine a subset of available videos related to a video selection category that should be included in the video selection category. In furtherance to the sports highlights example, video selection component 416 can determine or infer that the user is specifically interested in baseball highlights or baseball highlights for a particular team. Video selection component 416 can thus choose videos specifically related to baseball or the particular team for inclusion in the sports highlights video selection category. In addition to user preferences, MS keyboard usage history, and messaging session context, video selection component 416 can also determine or infer what videos to include in a particular video selection category based in video popularity at media provider 102. For example, video selection component 416 can choose videos based on how many views they have received or how frequently they have been viewed in the past N days (e.g. where N is a predetermined number).

In some aspects, category generation component 414 and/or video selection component 416 can infer video selection categories to include in an instance of an MS keyboard and the videos respectively included in the video selection categories based on information regarding videos that are frequently shared by other users of media provider 102 in a similar context. For example, information gathering component 404 can gather information regarding videos that are commonly shared by other users of media provider 102, (in association with other messaging sessions), in association with a particular subject or in response to discussion of a particular channel. According to this example, when topic of conversation is initiated regarding a recent sports match, information gathering component 404 can analyze other conversations (e.g., between other users of media provider 102) that also discussed the sports match and identify media that was frequently shared/discussed in association with the sports match. Category offering component 412 can then include a video selection category that includes the related media.

Figure 5:
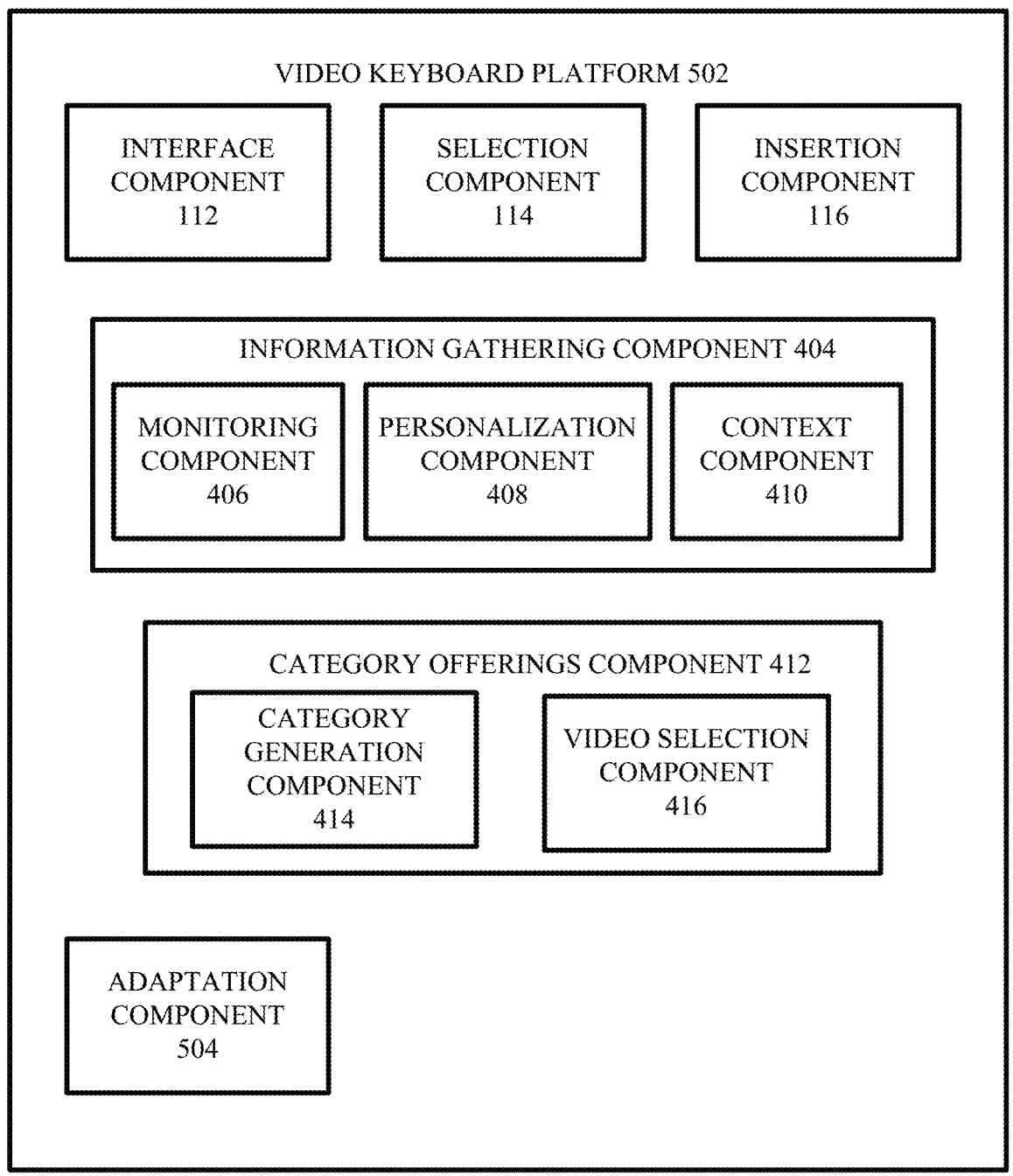
FIG. 5 illustrates another example media sharing keyboard platform that facilitates selecting videos to share in a messaging application in accordance with various aspects and embodiments described herein.

FIG. 5 presents another example video keyboard platform 502 in accordance with aspects and embodiments described herein. Video keyboard platform 502 can include same or similar features as video keyboard platform 402 with the addition of adaptation component 504. Video keyboard platform 502 is depicted isolated from other system components depicted in system 100 merely for exemplary purposes. In an aspect, video keyboard platform 502 is provided on client device 108. However, in other aspects, one or more components of video keyboard platform 502 can be provided at external media provider 102, another external system or device, and/or the cloud.

In an aspect, adaptation component 504 is configured to dynamically adapt the arrangement and presentation of video selection categories and other input categories/menu options provided in a MS keyboard based on information gathered by information gathering component 404. For example, adaptation component 504 can arrange categories that the user tends to user most frequently at the top of the list or forefront of the user interface so that they can be quickly accessed and visible to the user. Similarly, adaptation component 504 can arrange video selection categories based on relevancy to a current point in a messaging session. For example, when one user brings up the subject of funny elevator videos, a video selection category including funning elevator videos can be arranged at a prominent position of the MS keyboard interface. As the context of the conversation drifts away from funny elevator videos, adaptation component can remove this video selection category from the MS keyboard or push this category to a less prominent position of the interface.

Figure 6:
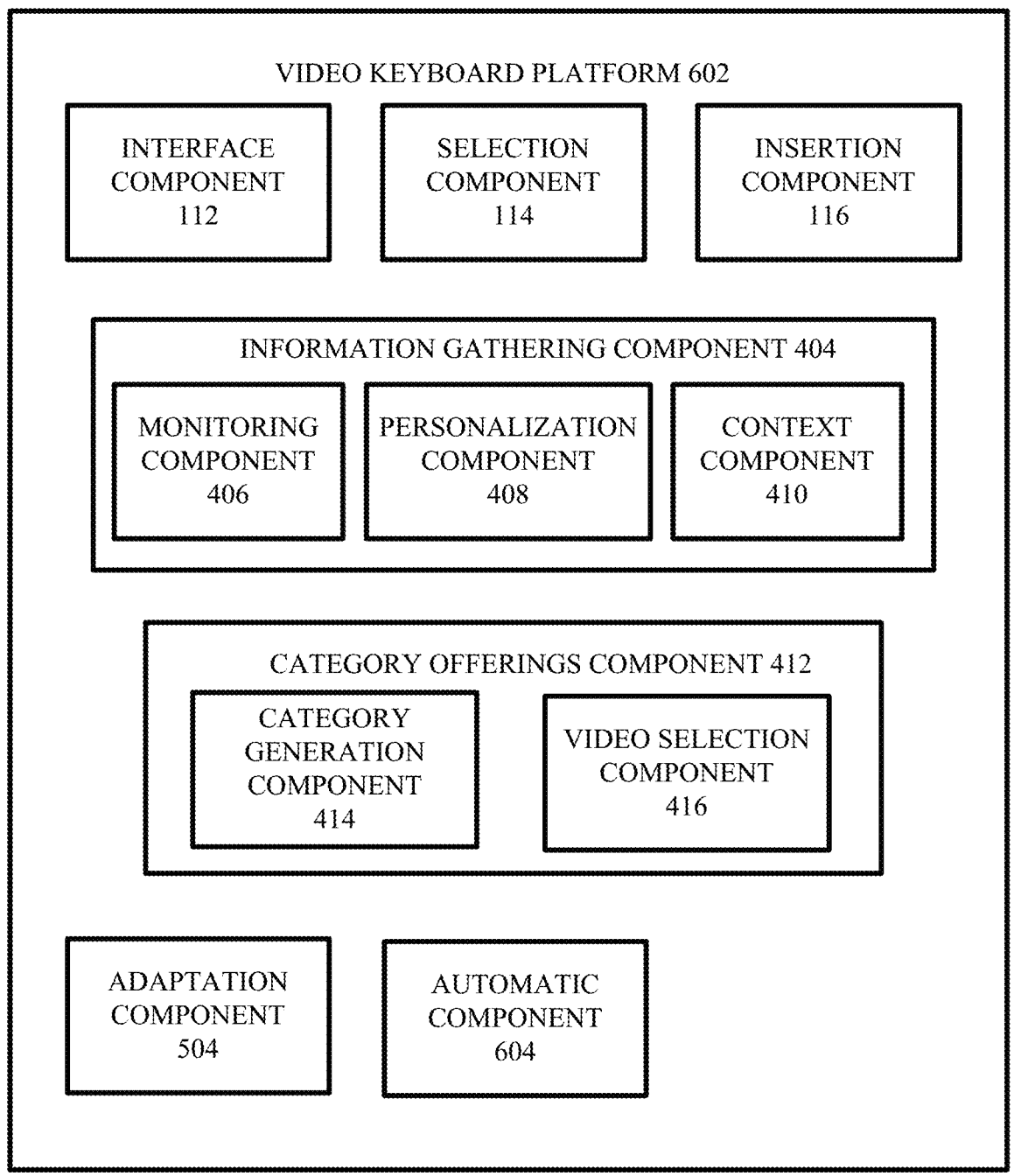
FIG. 6 illustrates another example media sharing keyboard platform that facilitates selecting videos to share in a messaging application in accordance with various aspects and embodiments described herein.

FIG. 6 presents another example video keyboard platform 602 in accordance with aspects and embodiments described herein. Video keyboard platform 602 can include same or similar features as video keyboard platform 502 with the addition of automatic component 604. Video keyboard platform 602 is depicted isolated from other system components depicted in system 100 merely for exemplary purposes. In an aspect, video keyboard platform 602 is provided on client device 108. However, in other aspects, one or more components of video keyboard platform 602 can be provided at external media provider 102, another external system or device, and/or the cloud.

Automatic component 604 is configured to automatically add videos or video references to a messaging session on behalf of the user or as an automated user representative of media provider 102. For example, to keep a conversation interesting, automatic component 604 can automatically insert media or media references provided by media provider 102 that automatic component 604 considers relevant to the conversation based on information received by information gathering component 404 and/or media trending at media provider. In an aspect, a video that was automatically selected and inserted by automatic component 604 can be associated with an icon indicating it was provided on behalf of the video keyboard platform system and not one of the users participating in the conversation. In another aspect, automatic component 604 can automatically insert media into a conversation of a messaging session on behalf of the user. For example, where a user shares a music video or song in a messaging session, automatic component 604 can be configured to automatically share other music associated with the user and/or the music video or song to the messaging session. For instance automatic component 604 can automatically publish to the messaging session, music videos listening history of the user, a playlist enjoyed by the user or music endorsements of the user.

Figure 7:
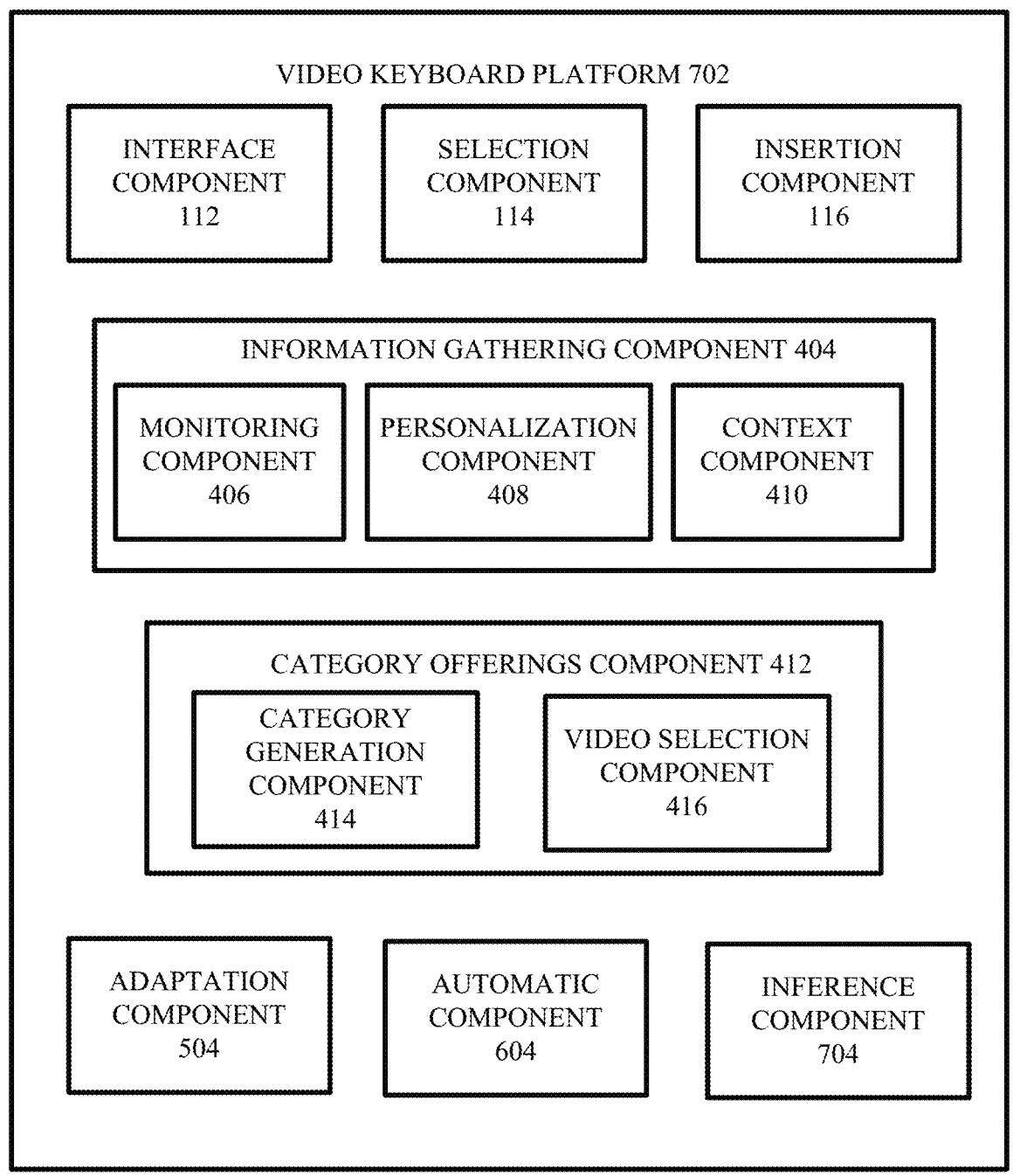
FIG. 7 illustrates another example media sharing keyboard platform that facilitates selecting videos to share in a messaging application in accordance with various aspects and embodiments described herein.

FIG. 7 presents another example video keyboard platform 702 in accordance with aspects and embodiments described herein. Video keyboard platform 702 can include same or similar features as video keyboard platform 602 with the addition of inference component 704. Video keyboard platform 702 is depicted isolated from other system components depicted in system 100 merely for exemplary purposes. In an aspect, video keyboard platform 702 is provided on client device 108. However, in other aspects, one or more components of video keyboard platform 702 can be provided at external media provider 102, another external system or device, and/or the cloud.

Inference component 704 is configured to provide for or aid in various inferences or determinations associated with aspects of video keyboard platform 702. For example, inference component 704 can infer what video selection categories to include in an instance of an MS keyboard and what videos to include in those respective categories based on learned information regarding user preferences, MS keyboard usage history of the user, and context of a current messaging session. Based on similar information, inference component 704 can further infer how to arrange and display video selection categories offered by the MS keyboard. For example, those used more frequently by the user or those which are most relevant to a current topic of a messaging session can be arranged front and center of the display screen while those less relevant can be provided on areas of the MS keyboard that can be revealed by scrolling.

In order to provide for or aid in the numerous inferences described herein, inference component 704 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
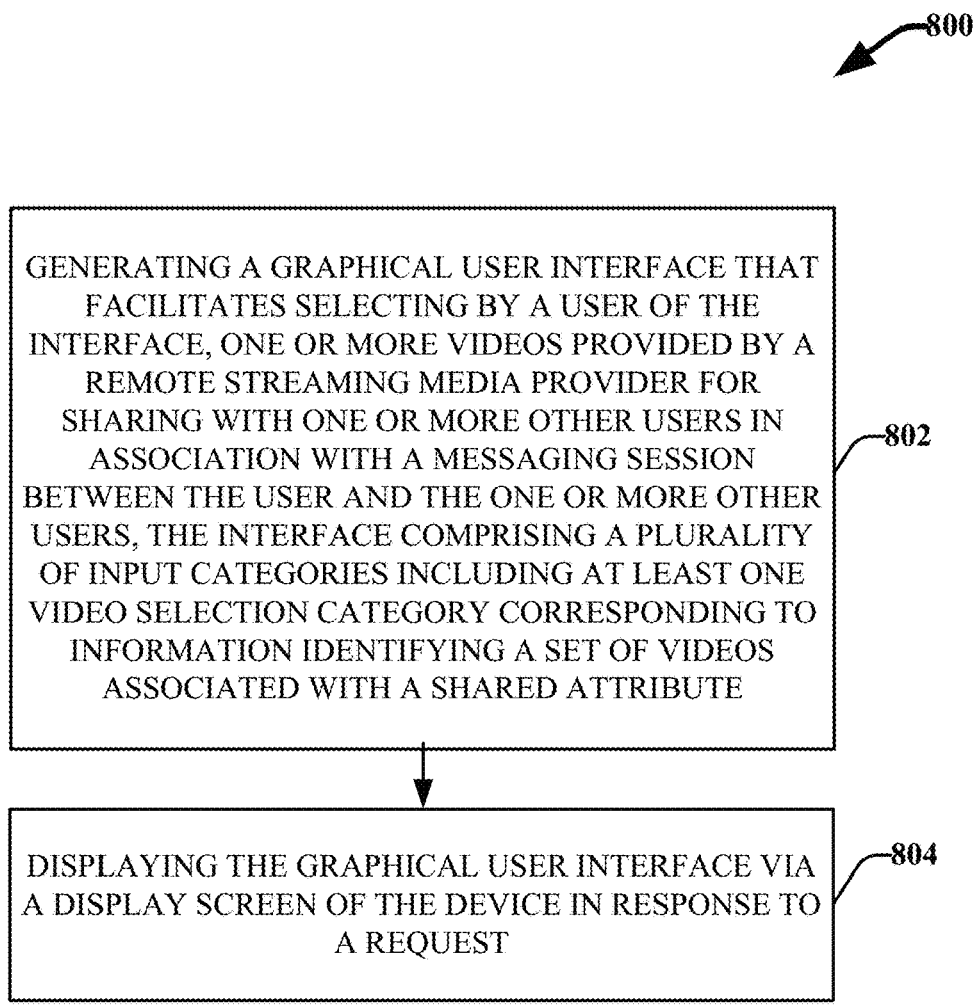
FIG. 8 is a flow diagram of an example method for generating a media sharing keyboard in association with selecting videos to share in a messaging application in accordance with various aspects and embodiments described herein.
Figure 9:
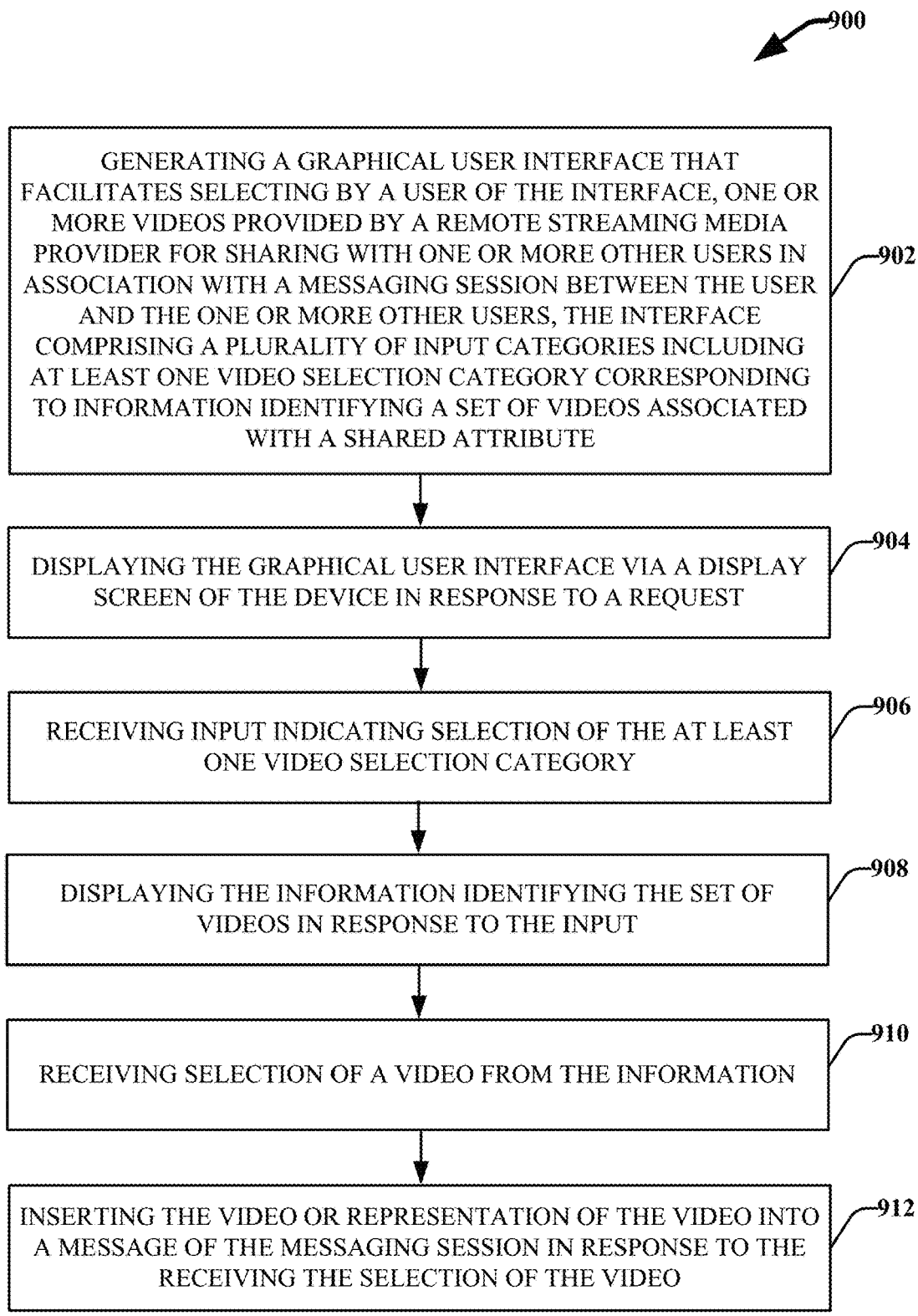
FIG. 9 is a flow diagram of an example method for selecting videos to share in a messaging application in accordance with various aspects and embodiments described herein.
Figure 10:
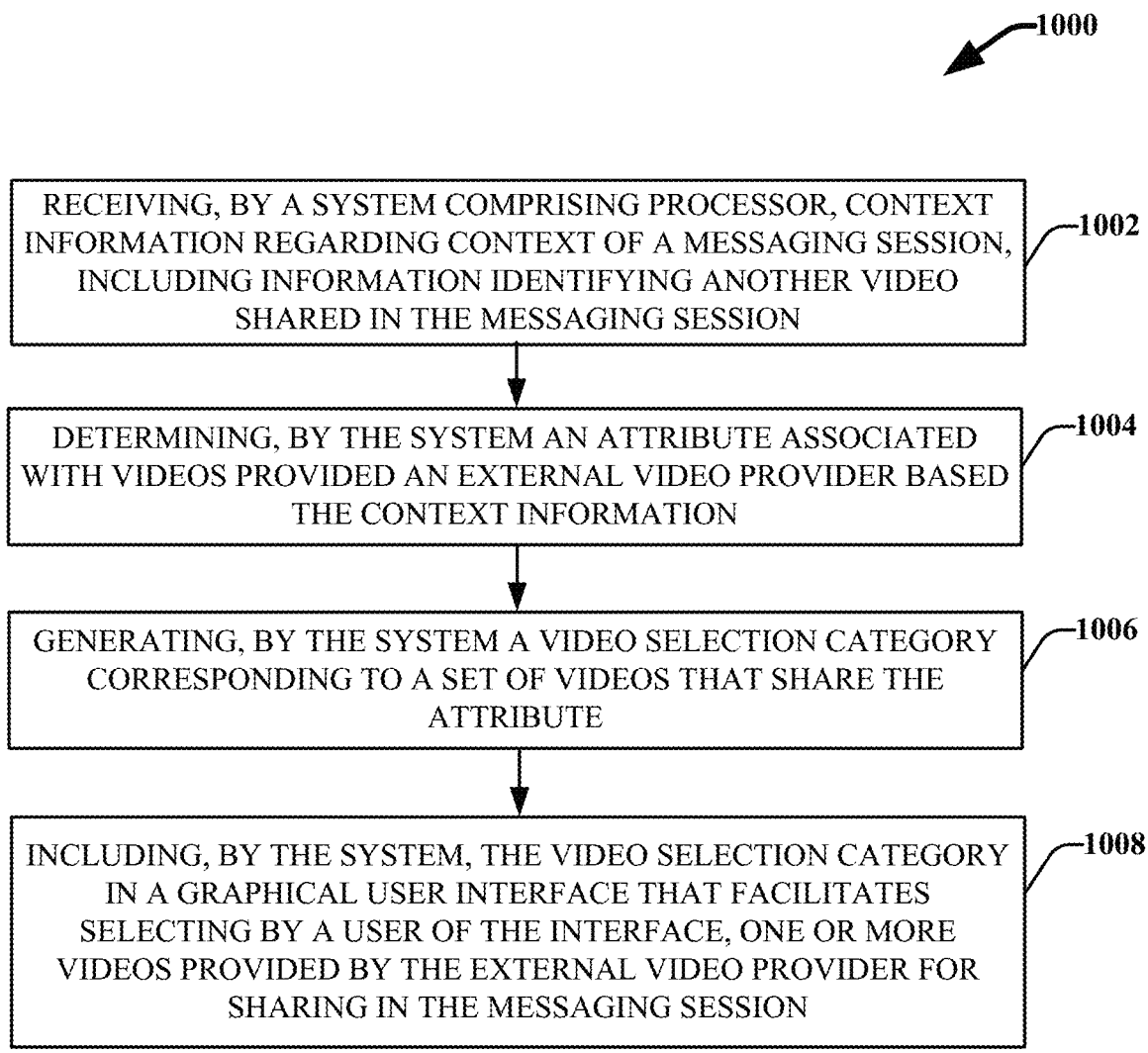
FIG. 10 is a flow diagram of another example method for selecting videos to share in a messaging application in accordance with various aspects and embodiments described herein.

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 for generating an MS keyboard to facilitate selecting videos to share in a messaging session in accordance with aspects described herein. At 802, a graphical user interface is generated that facilitates selecting by a user of the interface, one or more videos provided by a remote streaming media provider for sharing with one or more other users in association with a messaging session between the user and the one or more other users (e.g., via interface component 112). The interface can include a plurality of input categories including at least one video selection category corresponding to information identifying a set of videos associated with a shared attribute. For example, the video selection category can correspond to a set of videos provided by the remote streaming provider that are considered favorites of the user, videos the user has recently shared, videos the user has previously watched, videos recommended to the user for watching or sharing, or videos determined to be related to the messaging session (e.g., based on a context of the messaging session such as other videos shared via the messaging session or a topic of the messaging session). At 804, the graphical user interface is displayed via a display screen of the device in response to a request (e.g., via presentation component 120).

FIG. 9 illustrates a flow chart of another example method 900 for generating an MS keyboard to facilitate selecting videos to share in a messaging session in accordance with aspects described herein. At 902, a graphical user interface is generated that facilitates selecting by a user of the interface, one or more videos provided by a remote streaming media provider for sharing with one or more other users in association with a messaging session between the user and the one or more other users (e.g., via interface component 112). The interface can include a plurality of input categories including at least one video selection category corresponding to information identifying a set of videos associated with a shared attribute. At 902, the graphical user interface is displayed via a display screen of the device in response to a request (e.g., via presentation component 120).

At 904, input is received that indicates selection of the at least one video selection category (e.g., via selection component 114). At 906, the information identifying the set of videos is displayed in response to the input (e.g., via presentation component 120). At 908, a selection of a video from the information is received (e.g., via selection component 114). At 910, the video or a representation of the video is then inserted into a message of the messaging session in response to the receiving the selection of the video (e.g., via insertion component 116).

FIG. 10 illustrates a flow chart of another example method 1000 for employing an MS keyboard to facilitate selecting videos to share in a messaging session in accordance with aspects described herein. At 1002, context information is received by a system including a processor (e.g., video keyboard platform 702) regarding context of a messaging session, including information identifying another video shared in the messaging session (e.g., via information gathering component 404). At 1004, an attribute associated with videos provided an external video provider is determined based the context information (e.g., via category offerings component 412). At 1006, a video selection category is generated that corresponds to a set of videos that share the attribute (e.g., via category generation component 414). At 1008, the video selection category is included in a graphical user interface that facilitates selecting by a user of the interface, one or more videos provided by the external video provider for sharing in the messaging session (e.g., via interface component 112).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
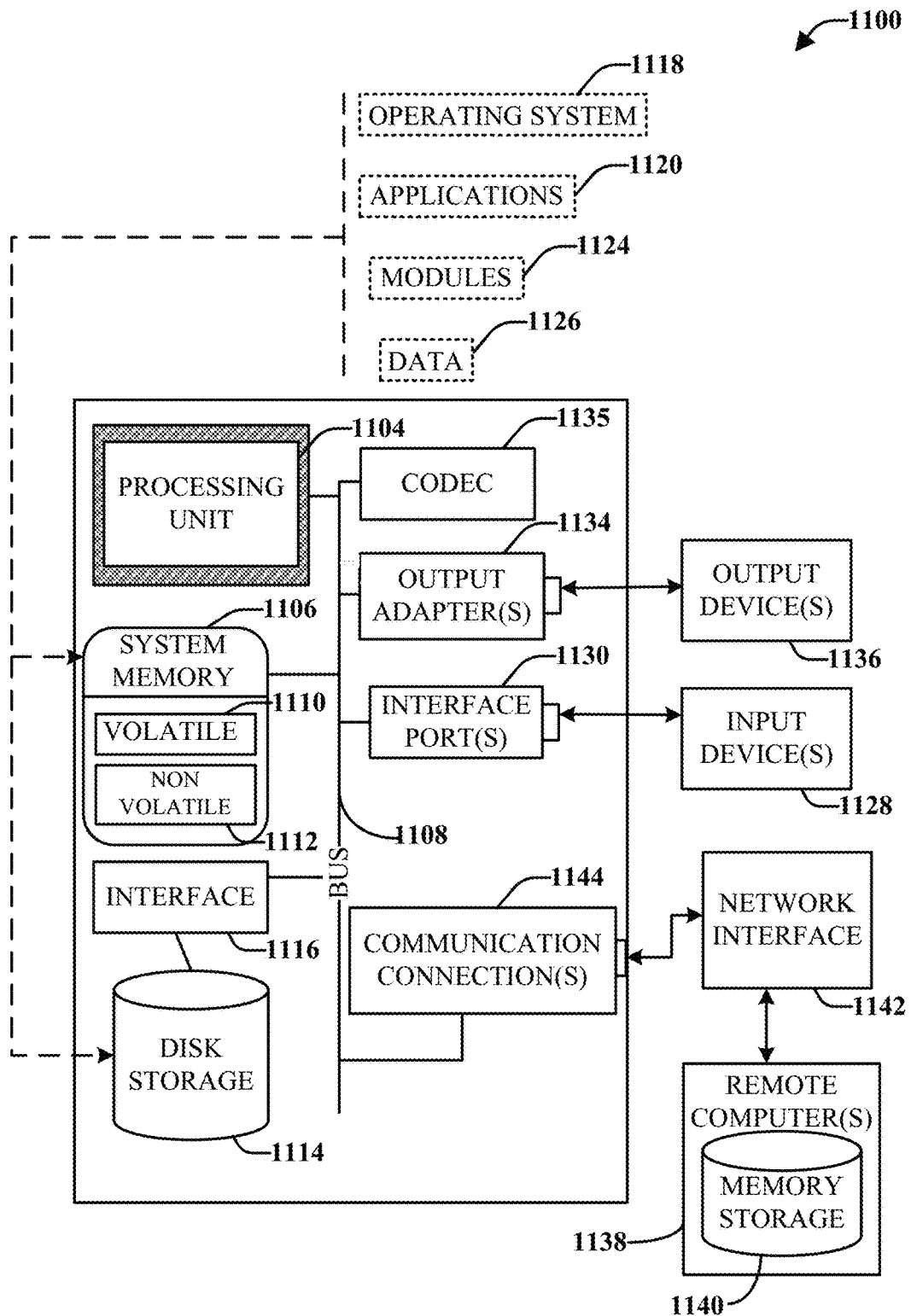
FIG. 11 is a schematic block diagram illustrating a suitable operating environment in accordance with various aspects and embodiments.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13114), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1105 may include at least one of an encoder or decoder, wherein the at least one of an encoder or decoder may consist of hardware, a combination of hardware and software, or software. Although, codec 1105 is depicted as a separate component, codec 1105 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s). Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
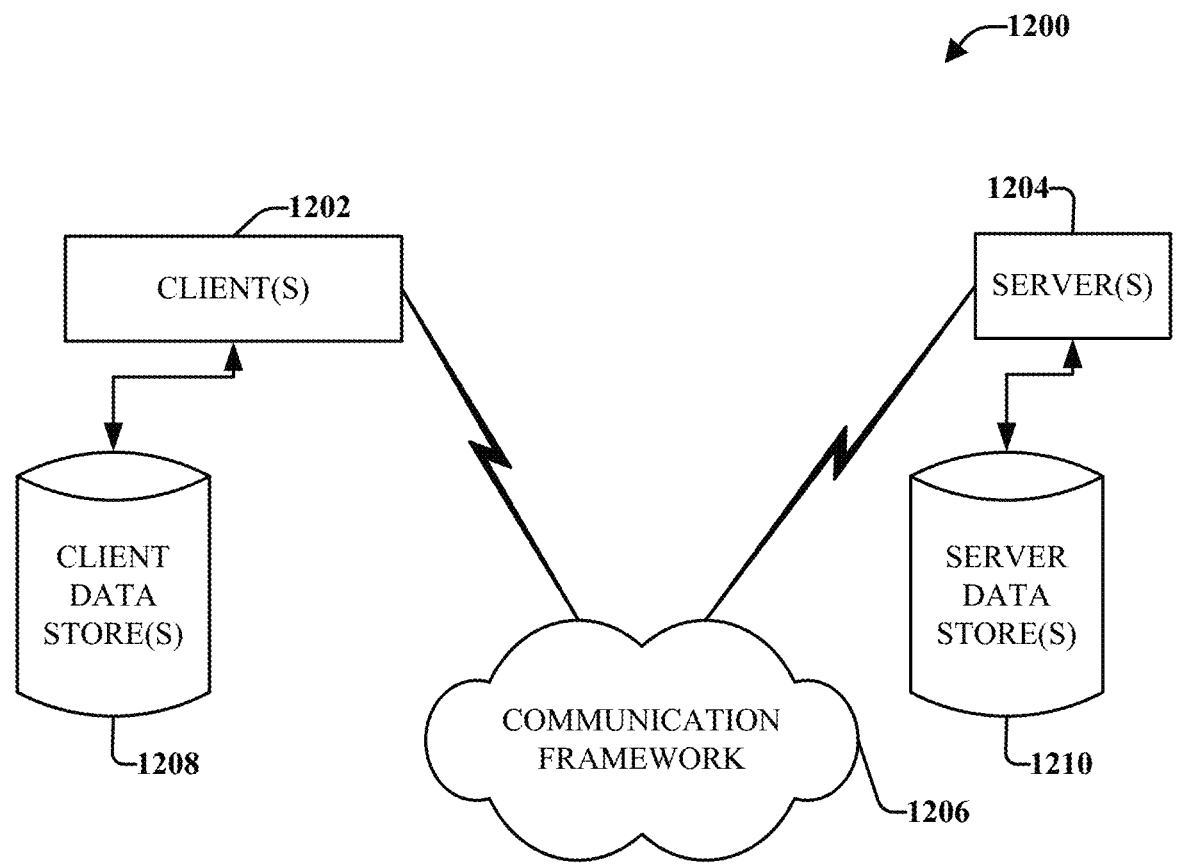
FIG. 12 is a schematic block diagram of a sample-computing environment in accordance with various aspects and embodiments.

Referring now to FIG. 12, there is illustrated a schematic block diagram of a computing environment 1200 in accordance with this disclosure. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes wherein the data packet may include video data. The data packet can include a metadata, e.g., associated contextual information, for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 include or are operatively connected to one or more client data store(s) 1208 that can be employed to store information local to the client(s) 1202 (e.g., associated contextual information). Similarly, the server(s) 1204 are operatively include or are operatively connected to one or more server data store(s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method comprising:
    receiving a selection of a messaging application executing on a computing device, wherein a first user and a second user are participating in a messaging session using the messaging application and wherein at least one of the first user and the second user has shared a video content item;
    in response to receiving the selection of an option to add media in the messaging application, generating a media sharing keyboard interface associated with the messaging application, wherein the media sharing keyboard interface includes (i) a first plurality of selectable icons each representing an item that was selected based on relevance to a context of the messaging session that includes the shared video content item and (ii) a second plurality of selectable icons that includes a first functional option to add text to the messaging session and a second functional option to select a new user to include in the messaging session, wherein the first plurality of selectable icons and the second plurality of selectable icons are concurrently displayed in the media sharing keyboard interface; and
    causing the media sharing keyboard interface to be presented via a display screen of the computing device.

2. The method of claim 1, wherein the received selection of the messaging application further comprises receiving a selection of a video sharing option in the messaging application.

3. The method of claim 2, wherein the item represented by one of the first plurality of selectable icons is a video content item provided by a remote streaming media provider and wherein the media sharing keyboard interface facilitates the selection of the video content item for sharing with one or more other users associated with the messaging session between a user of the computing device and the one or more other users.

4. The method of claim 3, wherein the second plurality of selectable icons includes a third functional option to search for one or more video content items provided by the remote streaming media provider.

5. The method of claim 3, further comprising selecting the video content item in response to receiving a selection of a video selection category from a plurality of video selection categories, wherein each of the plurality of video selection categories includes information identifying one or more videos associated with a shared attribute.

6. The method of claim 5, wherein the shared attribute comprises relatedness to the messaging session and wherein the video content item is selected in response to determining that the video content item is related to the messaging session.

7. The method of claim 6, wherein the video content item is determined to be related to the messaging session based on information identifying another video associated with the messaging session.

8. The method of claim 6, wherein the video content item is determined to be related to the messaging session based on information identifying a channel discussed in the messaging session.

9. The method of claim 6, wherein the video content item is determined to be related to the messaging session based on information identifying a topic discussed in the messaging session.

10. The method of claim 3, further comprising:
    in response to receiving, from the media sharing keyboard interface, a selection of a video selection category from a plurality of video selection categories, updating the media sharing keyboard interface to include video references of a set of videos associated with the video selection category; and
    in response to receiving, from the media sharing keyboard interface, a selection of a video reference corresponding to the video content item provided by the remote streaming media provider, embedding a representation of the video content item within the messaging session.

11. The method of claim 1, wherein the second plurality of selectable icons includes a third functional option to take a new video for sharing in association with the messaging session.

12. The method of claim 1, further comprising determining a position of at least one of the first plurality of selectable icons and the second plurality of selectable icons based on the context of the messaging session.

13. The method of claim 1, further comprising:
determining whether the context of the messaging session has changed; and
in response to determining that the context of the messaging session has changed, updating the media sharing keyboard interface in which at least one of the first plurality of selectable icons and the second plurality of selectable icons is modified.

14. A method comprising:
receiving a selection of a video sharing option in a messaging application executing on a computing device, wherein a first user and a second user are participating in a messaging session using the messaging application and wherein at least one of the first user and the second user has shared a video content item;
in response to receiving the selection of an option to add media in the messaging application, generating a media sharing keyboard interface associated with the messaging application, wherein the media sharing keyboard interface includes (i) a first plurality of selectable icons each representing a video content item that was selected based on relevance to a context of the messaging session that includes the shared video content item and (ii) a second plurality of selectable icons that includes a plurality of functional options for participating in the messaging session, wherein the first plurality of selectable icons and the second plurality of selectable icons are concurrently displayed in the media sharing keyboard interface; and
causing the media sharing keyboard interface to be presented via a display screen of the computing device.

15. The method of claim 14, wherein the video content item is provided by a remote streaming media provider and wherein the media sharing keyboard interface facilitates the selection of the video content item for sharing with one or more other users associated with the messaging session between a user of the computing device and the one or more other users.

16. The method of claim 15, further comprising selecting the video content item in response to receiving a selection of a video selection category from a plurality of video selection categories, wherein each of the plurality of video selection categories includes information identifying one or more videos associated with a shared attribute.

17. The method of claim 14, wherein the second plurality of selectable icons includes a functional option to add text to the messaging session.

18. The method of claim 14, wherein the second plurality of selectable icons includes a functional option to select a new user to include in the messaging session.

19. The method of claim 14, wherein the second plurality of selectable icons includes a functional option to take a new video for sharing in association with the messaging session.

20. A device, comprising:
a memory; and
a hardware processor that, when executing computer executable components stored in the memory, is configured to:
receive a selection of a messaging application executing on a computing device, wherein a first user and a second user are participating in a messaging session using the messaging application and wherein at least one of the first user and the second user has shared a video content item;
in response to receiving the selection of an option to add media in the messaging application, generate a media sharing keyboard interface associated with the messaging application, wherein the media sharing keyboard interface includes (i) a first plurality of selectable icons each representing an item that was selected based on relevance to a context of the messaging session that includes the shared video content item and (ii) a second plurality of selectable icons that includes a first functional option to add text to the messaging session and a second functional option to select a new user to include in the messaging session, wherein the first plurality of selectable icons and the second plurality of selectable icons are concurrently displayed in the media sharing keyboard interface; and
cause the media sharing keyboard interface to be presented via a display screen of the computing device.

* * * * *